P. W. REIMER.
SCALDING VAT.
APPLICATION FILED APR. 6, 1914.
1,185,941.
Patented June 6, 1916.
2 SHEETS—SHEET 1.
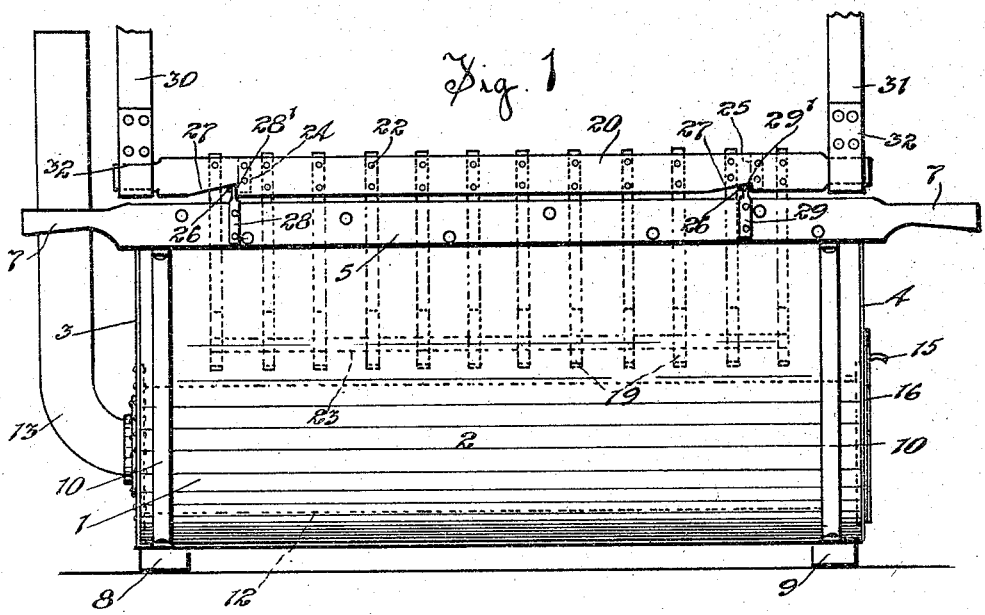
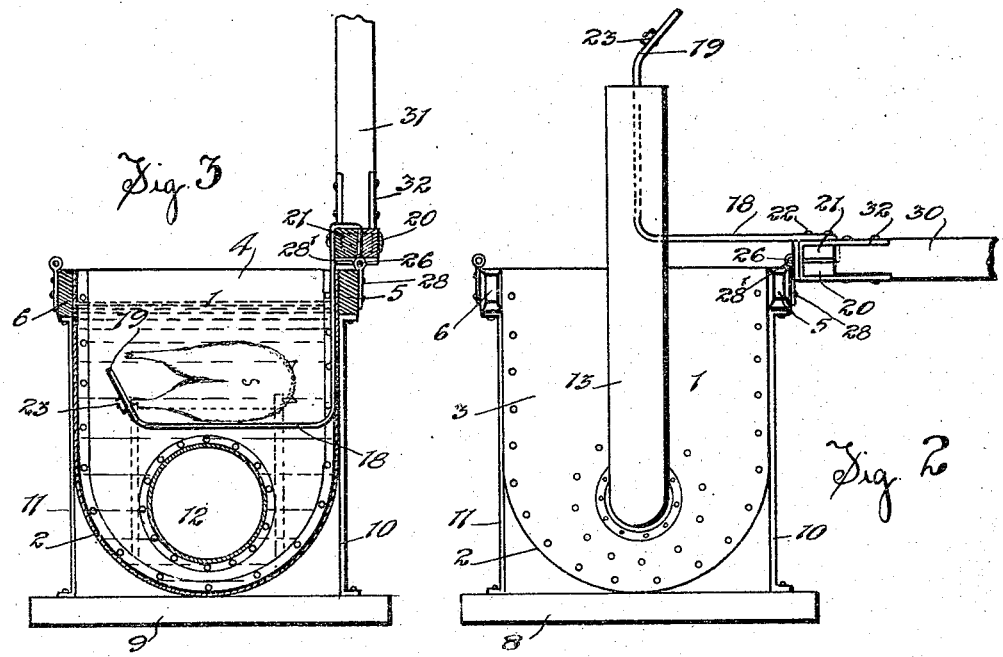

P. W. REIMER.
SCALDING VAT.
APPLICATION FILED APR. 6, 1914.
1,185,941.
Patented June 6, 1916.
2 SHEETS—SHEET 2.
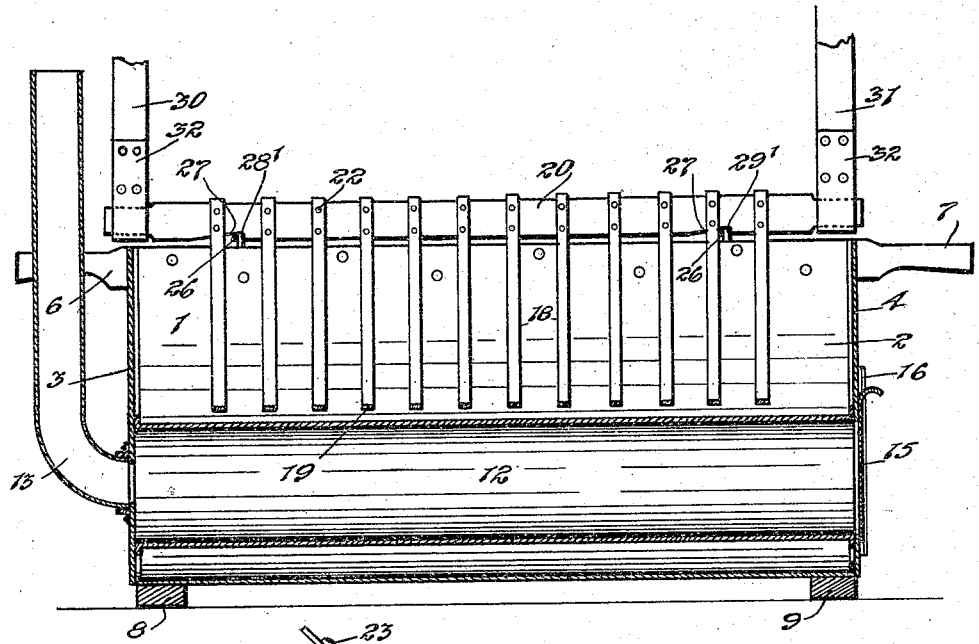
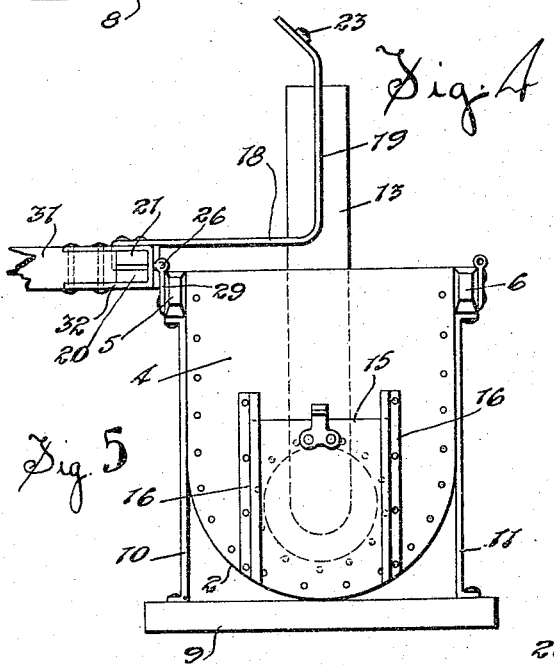
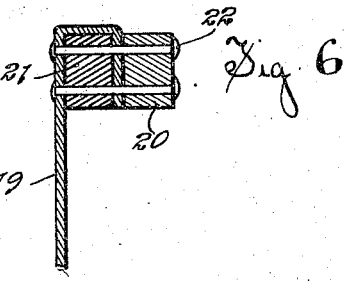
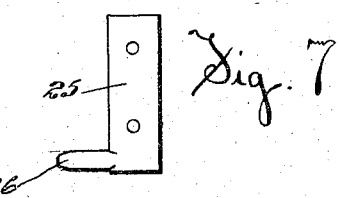
WITNESSES
INVENTOR
P. W. Reimer
By
Attorney.

UNITED STATES PATENT OFFICE.

PETER W. REIMER, OF ISLE-DE-CHENES, MANITOBA, CANADA.

SCALDING-VAT.

1,185,941.   Specification of Letters Patent.   Patented June 6, 1916.

Application filed April 6, 1914.   Serial No. 830,035.

*To all whom it may concern:*

Be it known that I, PETER W. REIMER, of the village of Isle-de-Chenes, in the Province of Manitoba, Canada, have invented certain new and useful Improvements in Scalding-Vats, of which the following is the specification.

The invention relates to improvements in scalding vats and the object of the invention is to provide a hand operated device wherein animals such as hogs can be quickly and effectively scalded, the device being specially designed for farm use and constructed so that it can be easily taken apart for storing purposes.

With the above objects in view the invention consists essentially in a suitably supported vat, a fire box passing lengthwise through the same, a removable rack pivotally secured to the vat and levers releasably secured to the rack, the parts being arranged and constructed as hereinafter more particularly described and later pointed out in the appended claim.

Figure 1 represents a side view of the complete device. Fig. 2 represents a front view of the same. Fig. 3 represents a vertical cross sectional view through the vat. Fig. 4 represents a longitudinal sectional view through the vat. Fig. 5 represents a rear view. Fig. 6 represents an enlarged detailed vertical sectional view through the beams carrying the bars 19 showing the manner in which the bars are connected to the beams. Fig. 7 is a side view of one of the pivot bars.

In the drawings like characters of reference indicate corresponding parts in each figure.

1 represents a vat formed preferably from sheet metal and comprising a body piece 2 of a U-shaped cross section and front and back end pieces 3 and 4, the end pieces being suitably riveted to the body piece.

5 and 6 represent a pair of side strips permanently secured to the sides of the vat at the top and having their ends extending beyond the ends of the vat and formed into suitable hand pieces 7.

8 and 9 represent front and rear bearing blocks on which the vat is mounted and 10 and 11 are brace bars tying the blocks to the side strips.

12 is a fire box within the vat and passing from end to end. This box is formed preferably from a sheet metal pipe having the ends outflared and securely riveted to the end plates 3 and 4.

It is to be noticed that the body of the fire box is raised above the bottom of the vat so that when the vat is filled with water the fire box is totally submerged in and surrounded by water.

13 is a stove pipe or chimney communicating with the forward end of the fire box.

15 is a fire door slidably mounted between a pair of vertical guides 16 secured to the end plate 4.

18 is a rack normally immersed within the water contained within the vat. This rack comprises a plurality of similar bars 19 having their upper ends bent in a more or less inverted U-shaped manner and received between a pair of parallel beams 20 and 21 the beams being fastened together by bolts 22 which also fasten the bars.

23 is a reinforcing rod connecting the ends of the bars together.

24 and 25 are a pair of plates inserted between the beams 20 and 21 and bolted to the same. The plates are each formed with an outstanding portion in the nature of a pivot pin 26 which extends into a notch 27 formed on the under sides of the beams. The pivot pins are received within eyes 28' and 29' located at the upper ends of short bars 28 and 29 secured permanently to the outer sides of the side strips 5 and 6.

The above construction provides a pivoted connection between the rack and vat.

30 and 31 are a pair of hand levers releasably connected to the ends of the beams 20 and 21, the connection being formed by securing a strap 32 to the end of each lever and passing the strap around the end of the beam which it will be noticed is slightly contracted.

An extra pair of bars fitted with eyes similar to those described are secured to the beam 5 so that if desired the rack can be pivotally connected to the opposite side of the vat.

In using the device for scalding an animal the vat is first filled with water and a fire built. When the water is hot the animal is placed on the rack which is at this time in the position shown in Fig. 2 of the drawings. Once the animal is on the rack the levers are swung upwardly to the position shown in Fig. 3 of the drawings where it will be seen that the animal is entirely submerged in the water. After it has been scalded for a sufficient time the levers are thrown down to the original position and the animal is removed from the rack.

The levers have been made removable as has also the rack so that they can be conveniently stored within the vat when not in use.

The double pairs of eyes are provided to allow the rack to be attached and manipulated from either side of the vat. To remove the rack it is only necessary to shift the beams endwise sufficiently far to release the pivot pins from the eyes.

What I claim as my invention is:

The combination with an open topped scalding vat and a side strip permanently secured to one side of the vat at the top, of a pair of upstanding bars permanently secured to the outer side of the side strip and fitted at their upper ends with alining eyes located above the strip, an immersing rack comprising a pair of inner and outer permanently connected beams having similar notches on their under sides, a pair of plates interposed between and permanently fastened to the beams and fitted with alined pivot pins located in the notches and adapted to enter the eyes, a plurality of similar L-shaped carrying bars secured permanently to the inner beam and adapted to enter the vat and extending operating levers attached to the beam.

Signed at Winnipeg this 18th day of December, 1913.

PETER W. REIMER.

In the presence of—
G. S. ROXBURGH,
ROLAND FOSTER.

Copies of this patent may be obtained for five cents each, by addressing the "Commissioner of Patents, Washington, D. C."